May 12, 1936.  M. H. MARTIN  2,040,180
CAR TRUCK
Filed Oct. 8, 1932   6 Sheets-Sheet 2

Inventor
Mark H. Martin
By Rector, Hibben, Davis & Macauley Attys.

May 12, 1936.                M. H. MARTIN                2,040,180
                              CAR TRUCK
                        Filed Oct. 8, 1932            6 Sheets-Sheet 5

Inventor:
Mark H. Martin

May 12, 1936.  M. H. MARTIN  2,040,180
CAR TRUCK
Filed Oct. 8, 1932  6 Sheets-Sheet 6

Inventor:
Mark H. Martin
By Rector, Hibben, Davis & Macauley Attys.

Patented May 12, 1936

2,040,180

UNITED STATES PATENT OFFICE 2,040,180

CAR TRUCK

Mark H. Martin, Reading, Pa., assignor to Birdsboro Steel Foundry & Machine Company, Birdsboro, Pa., a corporation of Pennsylvania Application October 8, 1932, Serial No. 636,808

7 Claims. (Cl. 105—197)

My invention relates to car trucks of the type employing a vertically movable bolster having guiding connection with the side frames and has particular reference to the character of the spring suspension utilized under these circumstances and its relation to other parts of the truck.

One object of my invention is to devise a truck of the type indicated embodying a spring suspension comprising coil and leaf springs, the suspension as a whole being characterized by non-harmonic properties for the purpose of improving the riding qualities and increasing the spring capacity of the truck, and also of preventing the vertical "jiggle" characteristic of spring groups composed only of coil springs which frequently result in the latter being driven solid and the transmission of uncushioned shocks directly to the journals, wheels and rails.

A further object is to provide a truck of the character indicated in which the truck bolster extends through the window openings of the side frames and has vertical, guidable connection therewith, but is supported wholly between the side frames in order to insure a distribution of the imposed load to all wheels of the truck, regardless of the condition of the tracks or the position of the car body.

A further object is to provide a truck as above set forth in which the coil springs are located in their customary position in the window openings of the side frames, with the leaf springs supporting the bolster at points between the frames and transmitting the imposed load to the coil springs, the two types of springs occupying a series load transmitting relation with respect to each other and coacting to prevent the creation of harmful oscillations in the spring suspension.

A further object is to devise a truck having a vertically movable, side frame engaging bolster having side bearings, the bolster load being carried to the side frames by a series arrangement of leaf and coil springs and the side bearings being vertically aligned with the vertical axis of the leaf springs upon which the bolster is supported, with a consequent shortening of the beam length of the bolster and a reduction in the bending stresses imposed thereon, the bolster outwardly of the side bearings requiring only sufficient strength to maintain the side frames in alignment transversely of the truck and to resist longitudinal loads occasioned by application of the brakes.

A further object is to provide a truck employing long, flexible leaf springs as the load transmitting connection between the bolster and the side frames, the springs being aligned vertically with the bolster side bearings and operating both as cushions for the bolster and as cantilever beams in transferring the load to the side frames.

A further object is to provide a railway car truck comprising side frames which support the standard spring group composed of four or more helical springs, the ends of the bolster having vertical sliding engagement with the frames and being supported upon the helical springs in addition to leaf springs, each of which has a two-bearing contact on the bolster and which is supported directly on the side frame, the two types of springs being arranged in parallel load-transfer relation as regards the transmission of the load from the bolster to the side frames.

These and further objects of my invention will be set forth in the following specification, reference being had to the accompanying drawings, and the novel means by which said objects are effectuated will be definitely pointed out in the claims.

Referring to Figs. 1 to 6, inclusive, which illustrate one truck modification, the numeral 10 designates the truck generally which is provided with a pair of side frames 11 that may be of the usual integral box or pedestal type, as desired. Each frame comprises a compression member 12 and a tension member 13 which are spaced from each other by bolster guide columns 14 that define the customary window or bolster opening 15. Except in such specific instances as may be hereinafter described, the side frame 11 conforms generally to standard practice.

Figure 1:
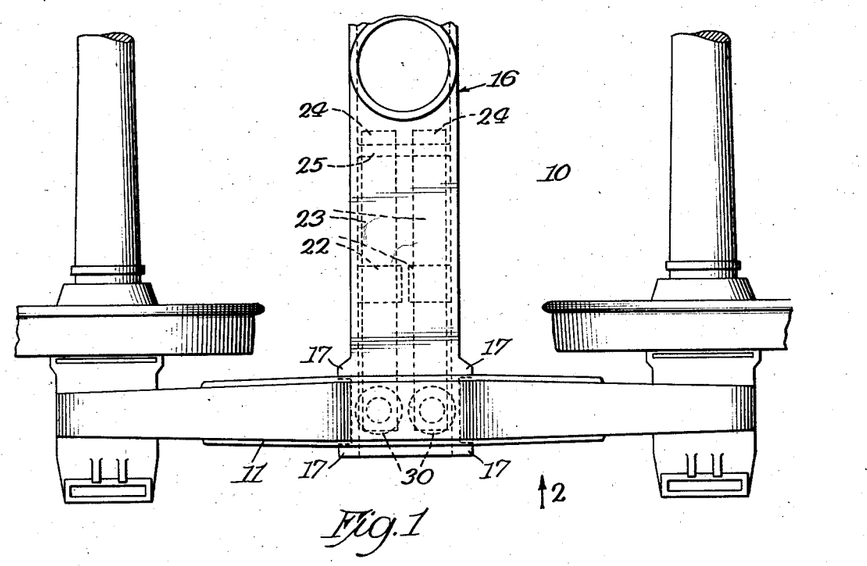
Figure 1 is a partial plan view of one form of my improved truck.
Figure 2:
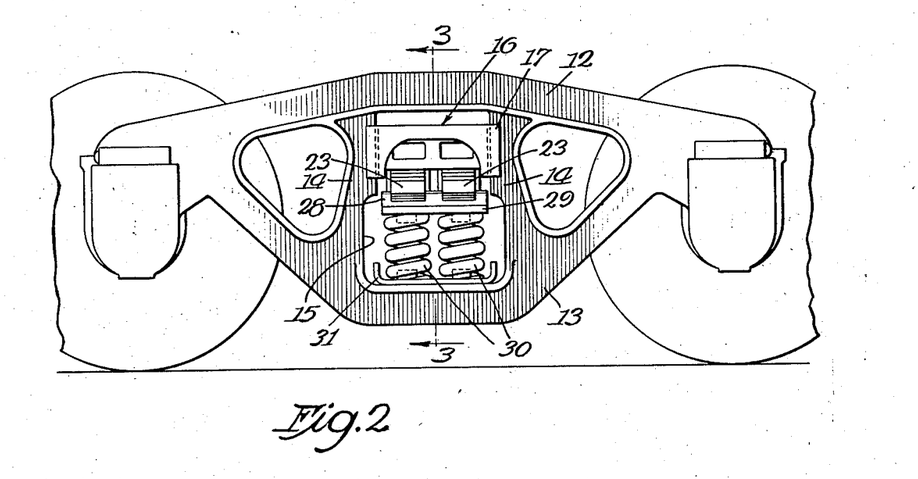
Fig. 2 is a side view of the truck shown in Fig. 1, looking in the direction of the arrow 2 in said figure.
Figures 3, 5, 6:
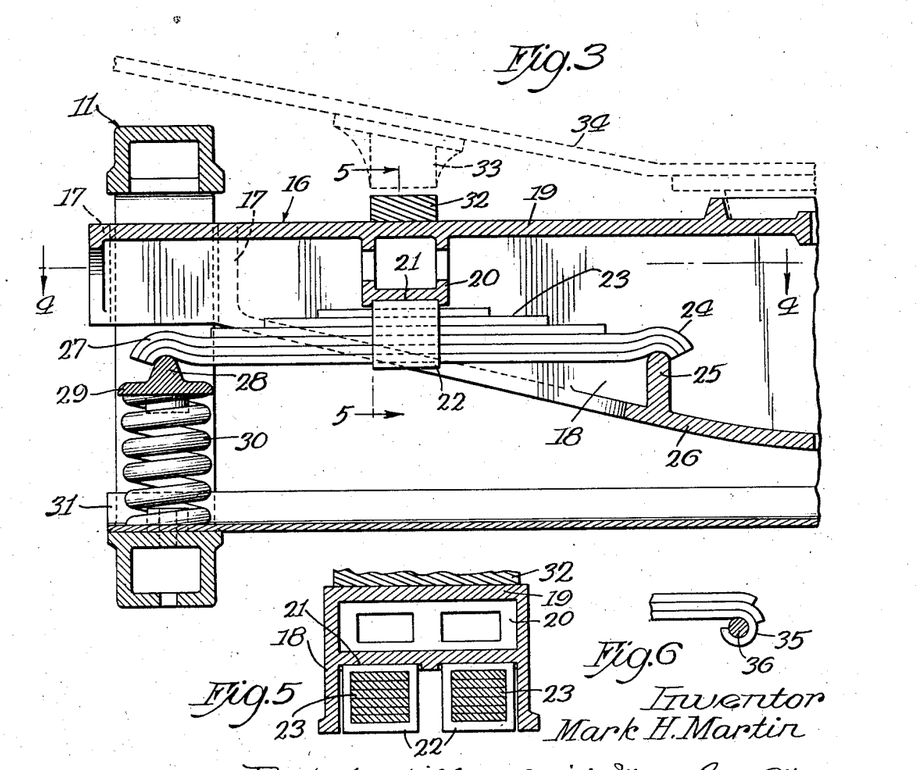
Fig. 3 is an enlarged, transverse sectional view of the truck, taken along the line 3—3 in Fig. 2, looking in the direction of the arrows, and showing the type of spring suspension employed.
Fig. 5 is a section taken along the line 5—5 of Fig. 3, looking in the direction of the arrows, and showing the manner of associating the leaf springs with the bolster.
Fig. 6 is a detailed view, partly in section, showing an alternative method of mounting the ends of the leaf springs, shown in Fig. 3, on either the truck bolster or the cap for the coil springs.

Extending through the window openings of the side frames are the ends of a truck bolster 16 which is guided in its vertical movements by the bolster guide columns of the frame and is limited in its endwise movement by the customary guide lugs 17 that project from the side walls 18 of the bolster and coact with the inner and outer surfaces of the guide columns.

Figure 4:
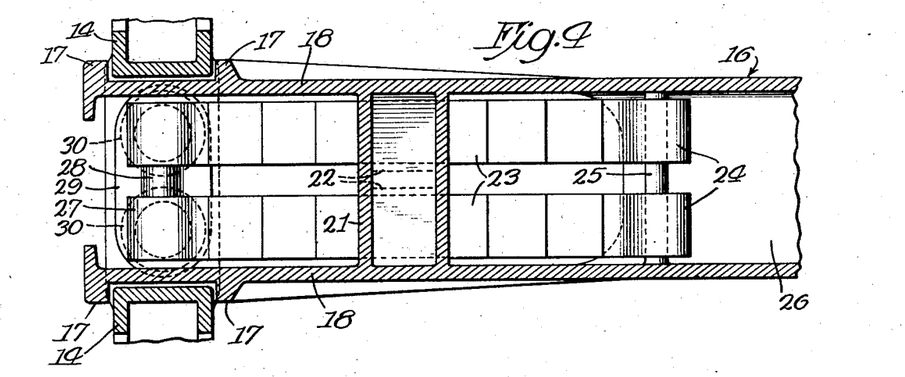
Fig. 4 is a sectional plan view of a portion of the truck, as viewed along the line 4—4 in Fig. 3, looking in the direction of the arrows.

A strut section 20 depends from the underside of the upper web 19 of the bolster on opposite sides of the center thereof and each strut is recessed as at 21 to receive the center bands 22 of a pair of leaf springs 23 which, in the present instance, are denoted as being of flat construction, but which may partake of other shapes as desired. The inner end 24 of each spring may be slightly hook-shaped to engage with the upper end of a web 25 that projects upwardly from the lower web 26 of the bolster and extends between the side walls thereof. The opposite end 27 of each spring may be similarly shaped to rest upon the upwardly projecting boss 28 formed upon a spring cap 29 that is located in the window opening 15 of the side frame. A pair of coil springs 30 abut against the underside of the cap 29 in symmetrical disposition relative to the leaf springs and is supported upon the usual spring plank 31 that is carried upon the tension member of the side frame. The spring plank 31 extends between the side frames and coacts therewith in the usual manner.

As shown clearly in Fig. 3, the lower bolster web 26 terminates in the region of the upwardly extending web 25, while the upper web 19 continues throughout the length of the bolster. The bolster is therefore characterized by a box section centrally thereof and by a channel section beyond the ends of the lower web, so that the leaf springs are partially housed within the bolster and each has two points of bearing contact therewith.

Secured to the upper web 19 are the bolster side bearings 32 which are located inwardly of the side frames and preferably in alignment vertically with the vertical axis of the spring group composed of the leaf springs 23. These side bearings are intended to coact in the usual manner with the body side bearings 33 provided on a body bolster 34, both of the latter parts being shown dotted in Fig. 3. By so arranging the side bearings and leaf spring groups, it is possible to considerably reduce the beam length of the bolster, since the load is transmitted to the spring suspension at points located inwardly of the side frames, with a consequent reduction in the bending stresses resulting therefrom. Outwardly of the side bearings, therefore, the bolster need only have sufficient strength to assist in holding the side frames in alignment transversely of the truck and also to resist shocks occasioned by application of the brakes.

In Fig. 6 is illustrated a detail modification of the manner of providing a connection between the ends of a leaf spring 23, the bolster 16 and the spring cap 29. This change consists in bending the lower leaf 35 of each leaf spring around a pin 36 which may be suitably supported on either the bolster or the spring cap. Either of the methods provides for a non-shiftable connection between the leaf springs and the other indicated portions of the truck.

So far as the relation of the bolster to the side frames is concerned, the action thereof is generally the same as now obtains in standard practice, since the bolster is guided in its vertical movement in the window openings of the side frames and assists, in conjunction with the spring plank 31, in maintaining the squareness of the truck.

In addition, the truck embodies certain other specific advantages. In the first place, because of the nature of the spring suspension, which consists of leaf and coil springs arranged in series, load-transmitting relation with respect to each other, the suspension is characterized by non-harmonic properties which serve to improve the riding qualities of the truck with a consequent minimization of damage to perishable lading, as well as to the rolling stock itself. Because of the different nature of the two types of springs employed, it is possible to so arrange their natural periods of vibration as to positively exercise a damping action, one upon the other, so that any tendency of the spring group, considered as a unit, to set up violent oscillations, as now characterizes simple helical spring groups, is positively prevented. Accordingly, a truck of this nature is not only well adapted for passenger service, but also for refrigerator cars that are utilized to transport goods that are susceptible to shocks.

The leaf springs 23 are relatively long and highly flexible, but are capable, upon the occurrence of minor vibrations, to operate merely as a cantilever beam in the transmission of the load, leaving the helical springs to absorb the small shocks.

A further advantage resides in the relative disposition of the side bearings and the leaf springs that permit the application of the load to the spring suspension at points inwardly of the side frames, thereby insuring a distribution of the imposed load to all wheels of the truck and so obviating one hazard of railway operation, namely, the lightly loaded wheel. The same disposition also shortens the beam length of the bolster, as compared to standard forms of construction in which the load is transmitted outwardly from the center plate to substantially the ends of the bolster which are supported upon spring groups carried wholly by the side frames. Accordingly, the bolster section may be considerably lightened outwardly of the side bearings, since dependence is only placed on these portions of the bolster to maintain the squareness of the truck and resist braking shocks.

It is also possible by this design to locate the coil springs wholly within the marginal outlines of the side frames proper, as contrasted with the overhanging spring plank support now common in standard practice to accommodate spring groups of four or more helical springs.

Figures 7, 8, 9:
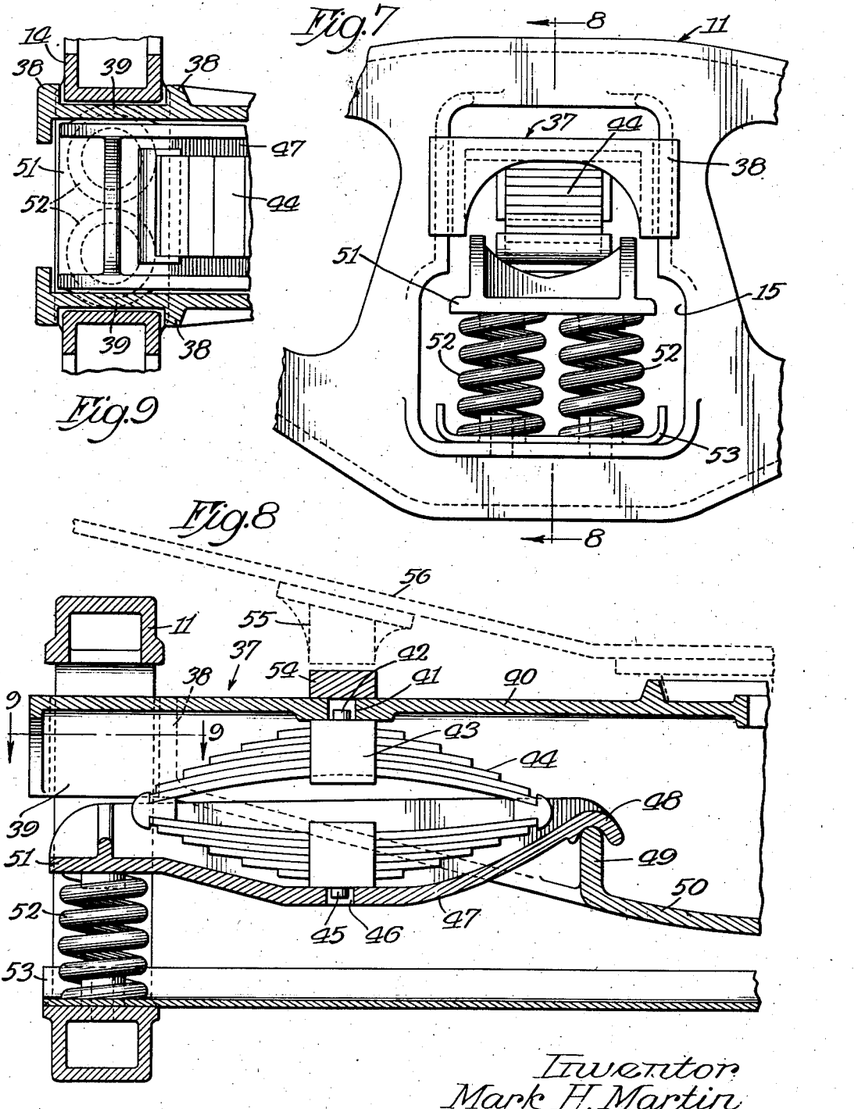
Fig. 7 is a partial side view of a modified form of truck, comparable generally to the view shown in Fig. 2.
Fig. 8 is a transverse sectional view through the truck shown in Fig. 7, as taken along the line 8—8 in said figure looking in the direction of the arrows, and showing the series arrangement of full elliptic and coil springs utilized in this form of truck.
Fig. 9 is a section taken along the line 9—9 in Fig. 8, looking in the direction of the arrows, and showing the plan arrangement of the two types of springs.

In Figs. 7 to 9, inclusive, is illustrated a modification of my improved truck which differs from that just described essentially in the nature of the spring suspension. Since the side frames are of generally the same construction as those heretofore described, they will be denoted by the same numeral 11. The ends of a truck bolster 37 project through the window opening of said frames and guide lugs 38 project from the side walls 39 thereof to assist in guiding the bolster in its vertical movements between the bolster guide columns of the side frames.

The upper bolster web 40 is apertured as at 41 between the center plate and the adjacent side frame to receive a centering lug 42 provided on an upper spring band 43 forming part of an elliptic spring 44. The lower band of said spring is likewise provided with a centering lug 45 which is received within an aperture 46 formed in a beam 47 having generally a channel section, the lower half of the elliptic spring being nested within this beam. The inner end 48 of said beam is substantially hook-shaped for the purpose of resting upon and having a non-shiftable connection with the upper end of a web 49 that projects upwardly from the bolster lower web 50. As noted clearly in Fig. 8, the nature of the connection between the beam 47 and the web 49 provides for some degree of rocking action between these parts. The opposite end 51 of said beam is horizontally disposed to provide a cap or seat for the upper ends of a pair of coil springs 52 which are in substantial alignment with the vertical center plane of the associated side frame and whose lower ends rest upon one end of a spring plank 53 that is supported in the usual manner by the tension member of the side frame. It will be understood that the spring plank 53 extends between the side frames of the truck and that the spring suspension, including the beam 47, heretofore described, is duplicated on the opposite side of the bolster center plate.

The truck bolster is provided with a pair of side bearings 54, each of which is located inwardly of the adjacent side frame and specifically in vertical alignment with the vertical axis of the elliptic spring 44. The purpose of this arrangement is the same as heretofore described. The bolster side bearings 54 coact in the usual manner with the body side bearings 55 provided on a body bolster 56.

The truck illustrated in Fig. 8 embodies all of the advantages of the truck shown in Fig. 3, namely, the transfer of the applied load to the spring suspension inwardly of the side frame, the absence of violent oscillations in the spring suspension, and the relative arrangement of the side bearings and the springs. The specific difference between this truck and the former truck, however, consists in the utilization of the beam 47 which permits the elliptic spring 44 to operate simply and solely as a spring. No dependence is placed upon the spring 44 to operate as a beam, because of the presence of a specific element for that purpose.

Figure 10:
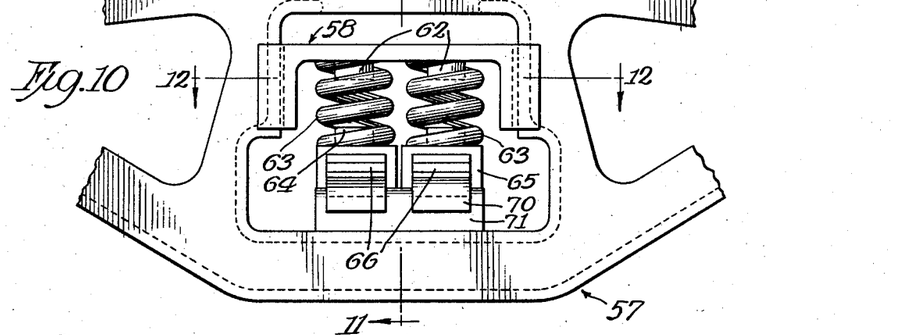
Fig. 10 is a partial side view showing a further modification of the truck.
Figures 11, 12:
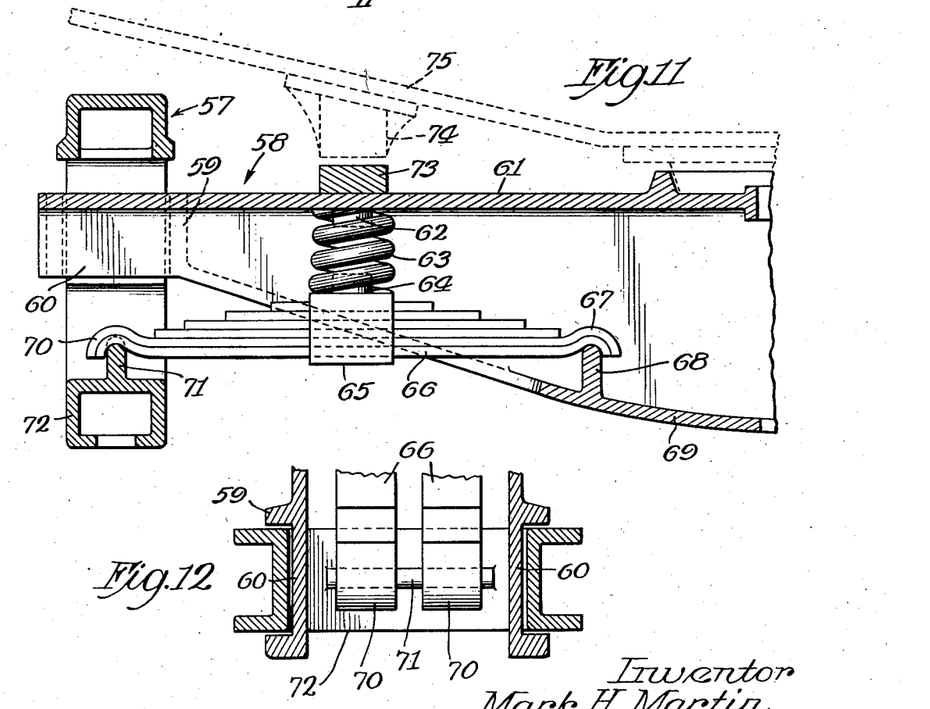
Figs. 11 and 12 are sections taken along the lines 11—11 and 12—12, respectively, in Fig. 10, looking in the direction of the arrows, and showing the specific form of spring suspension used in this particular form of truck.

Referring to Figs. 10 to 12, inclusive, which illustrate a still further modification of the truck, the numeral 57 designates the side frames thereof which are characterized by a slightly different construction from those heretofore described and, for reasons presently explained, possess a generally shorter height measured vertically across the window opening between the compression and tension members of the frame. Extending through the window openings of the frame 57 are the ends of a truck bolster 58 having side walls 60 from which project laterally, guide lugs 59 which facilitate the vertical movements of the bolster between the bolster guide portions of the side frames.

Depending from the underside of the upper bolster web 61, between the center plate and adjacent side frame is a pair of centering lugs 62 which serve to position the upper ends of a pair of helical springs 63 that abut against the underside of said web. The lower ends of said spring are pivotally centered by lugs 64 that project upwardly from the center bands 65 of a pair of leaf springs 66, each leaf spring being in series relation with one helical spring. The inner end 67 of each leaf spring is generally hook-shaped to appropriately and rockably engage with the upper edge of a web 68 that projects upwardly from the bolster lower web 69 and may extend between the side walls 60 thereof, while the opposite end 70 of each leaf spring is similarly shaped for a like engagement with the upper edge of a web 71 that projects upwardly from the tension member 72 of the adjacent side frame between the bolster guide columns thereof. As shown clearly in Fig. 11, the lower web 69 terminates just outwardly of the web 68, so that the leaf springs are partially housed within the bolster and have two points of bearing contact therewith, one of which is yieldable, as provided by the coil spring 63.

A bolster side bearing 73 is located on the upper bolster web 61 between the center plate and the adjacent side frame and is preferably aligned vertically with the vertical axis of the spring group comprising the leaf and helical springs before noted and for reasons hereinbefore described. The bolster bearings 73 coact in the customary manner with the body side bearings 74 attached to a body bolster 75.

As in the types of trucks heretofore described, the spring suspension in the present instance is also characterized by non-harmonic properties, as well as by the other advantages above noted. The leaf springs 66 function both as a spring and as a beam in the transmission of the load to the side frame, while the coil spring 63 may operate to absorb those minor shocks which are not capable of flexing the leaf spring. One of the particular advantages of the instant construction resides in the elimination of the customary spring plank with a corresponding reduction in the total weight of the truck. The usual function of the spring plank is conjunctively performed by the bolster 58 and also by the leaf springs 66 which have a non-shiftable connection with the side frames and also with the bolster. By this construction, it is also possible to materially shorten the over-all height of the side frames measured vertically across the window opening.

Figure 13:
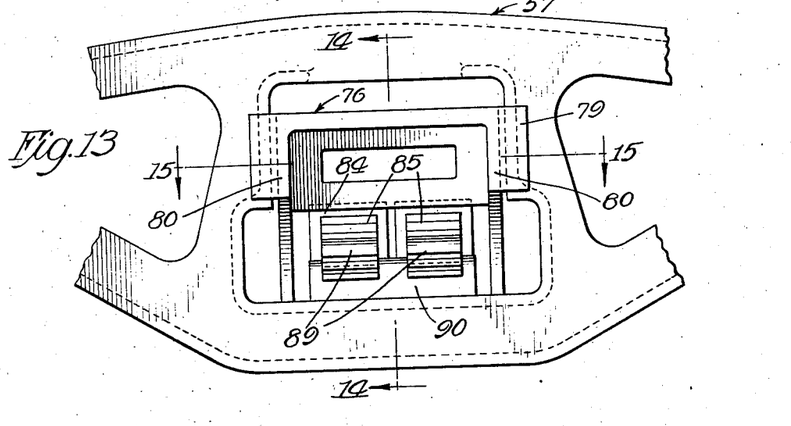
Fig. 13 is a partial side view showing a still further modification of the truck.
Figures 14, 15:
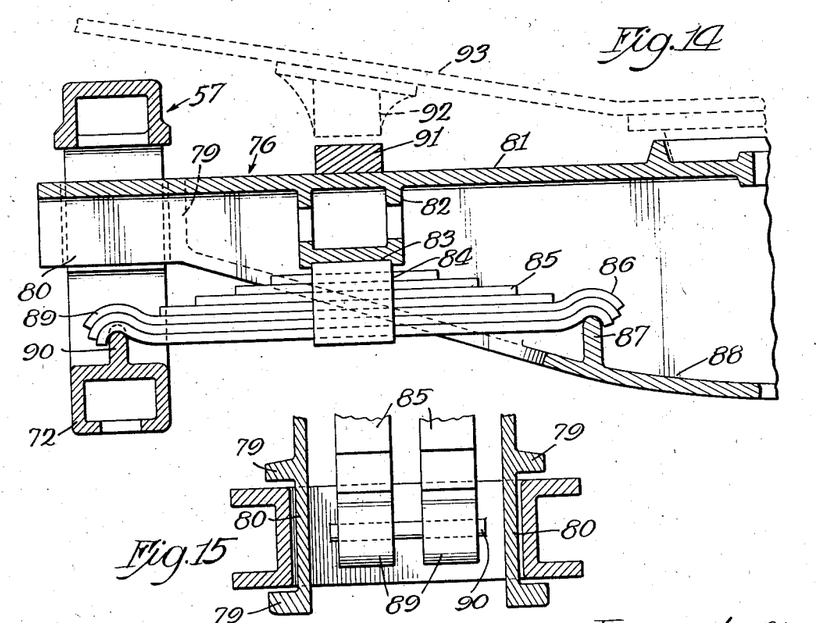
Figs. 14 and 15 are sections along the lines 14—14 and 15—15, respectively, in Fig. 13, looking in the direction of the arrows, and showing the detailed features of the spring groups forming the suspension for this type of truck.

The modification illustrated in Figs. 13 to 15, inclusive, bears a closer resemblance to the truck illustrated in Fig. 11 than to the other truck described above. In fact, the instant truck is distinguished from the truck shown in Fig. 11 only by the elimination of the coil spring 63. Since the side frames employed in this truck are substantially the same as those discussed in connection with Fig. 11, the same numerals will be applied thereto.

The end of a truck bolster 76 projects through the window opening of the side frame 57 and projecting laterally from the side walls 80 thereof are guide lugs 79 which serve to constrain the bolster to vertical movement between the bolster guide column of the side frame.

Depending from the upper bolster web 81 between the center plate and adjacent side frame is a strut section 82 whose lower side may be recessed as at 83 to receive the center bands 84 of a pair of leaf springs 85. The inner end 86 of each spring is generally hook-shaped to rockably engage the upper edge of a web 87 that projects upwardly from the lower bolster web 88. The outer end 89 of this spring is similarly shaped for the same type of engagement with the upper edge of a web 90 that projects upwardly from the tension member 72 of the side frame between the bolster guide columns thereof. The lower bolster web 88 terminates just beyond the adjacent web 87, so that the leaf springs 85 are partially housed within the truck bolster and have two points of bearing contact therewith, the inner ends and center bands thereof. The nature of the connection between the leaf springs, bolster and side frames is such as to prevent any relative shifting of these parts, transversely of the truck, although permitting a slight rocking action to accommodate the weaving action of the truck as it passes over the road bed.

Secured to the upper side of the upper bolster web 81 is a bolster side bearing 91 which is located inwardly of the adjacent side frame and in vertical alignment with the vertical axis of the spring group comprising the leaf springs 85. The purpose of this particular position has already been discussed in connection with the trucks described above. As before, the bolster side bearings 91 coact with body side bearings 92 provided on a body bolster 93.

In this particular truck, there is only a single type of spring which requires that it be somewhat stiffer than the leaf spring shown in the truck illustrated in Fig. 11. This spring suspension is lacking in any non-harmonic qualities, but is capable of absorbing a larger percentage of transmitted shock, then would a comparable helical spring suspension, because of the characteristic frictional and therefore energy-absorbing action between the several leaves of the spring unit. The nature of this spring suspension also permits the elimination of the spring plank.

Figure 16:
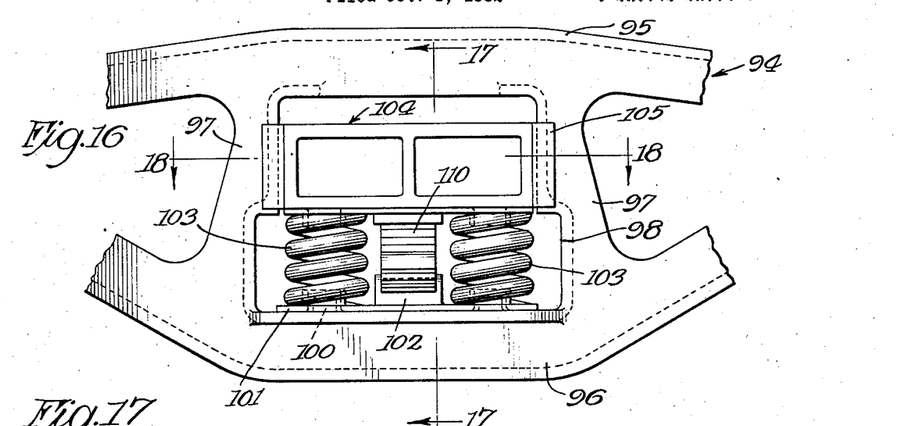
Fig. 16 is a partial side view of a further modification of the truck.
Figure 17:
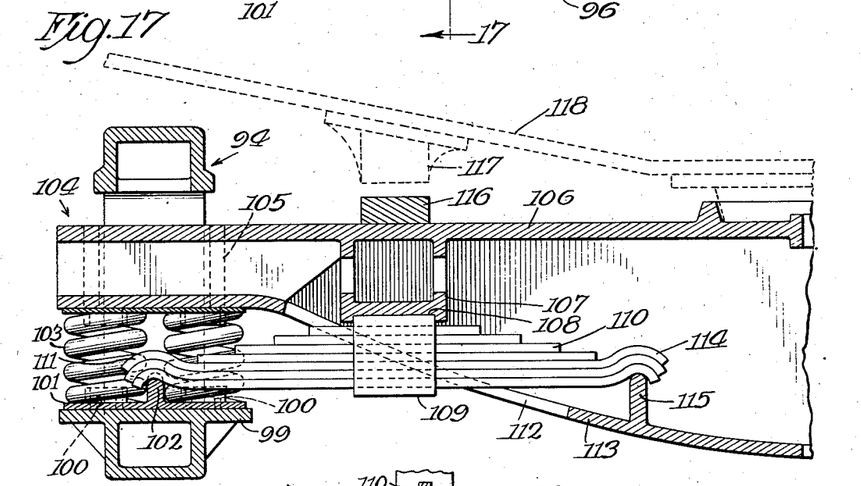
Figs. 17 and 18 are sections along the lines 17—17 and 18—18 in Fig. 16, looking in the direction of the arrows, and showing the detail of the spring suspension constituting the principal feature of this truck type.
Figure 18:
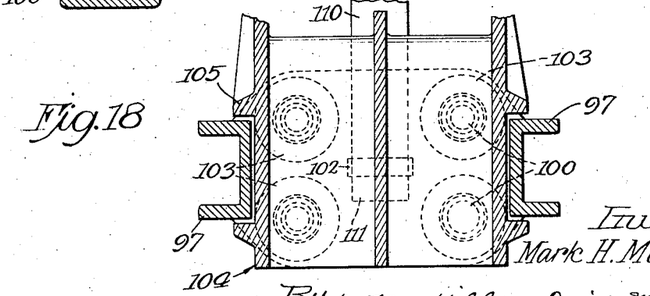

Referring to Figs. 16 to 18, inclusive, there is illustrated a further modification of the truck which is fundamentally distinguished from those heretofore described by the employment of a spring suspension characterized by a parallel arrangement of coil and leaf springs, as contrasted with the series arrangement already noted.

In the drawings, the numeral 94 designates one of the side frames of the truck that comprises the usual compression member 95, tension member 96, and bolster guide columns 97 which define a bolster opening 98. The portion of the tension member between the guide columns is provided with a spring seat portion 99 having a plurality of appropriately disposed, upwardly extending bosses 100 that are received within apertures provided in a spring plate 101 that rests upon the portion 99. For a purpose hereinafter explained, the plate 101 also comprises an upwardly extending lug or rib 102 that is preferably located in the longitudinal center plane of the side frame.

Seated on said plate is a group of helical springs 103 that support one end of a bolster 104 which extends through the window opening of said frame and is suitably guided vertically by lugs 105 projecting laterally from the side walls thereof. Depending from the upper bolster web 106 between the center plate and each side frame is a strut section 107 whose lower surface may be recessed as at 108 to receive the center band 109 of a semi-elliptic spring 110. At the outer end 111 of each spring 110, several of the leaves thereof may be curved to provide a hook for providing a non-shiftable engagement with the upper end of the lug 102, while the opposite end 114 projects inwardly toward the center of the truck through an opening 112 provided in the lower bolster web 113. The last named end 25 of each spring 110 is similarly hook-shaped for engagement with the upper end of a web 115 that projects upwardly from the web 113. Each spring 110 is therefore characterized by a two point bearing contact with the bolster and is also supported directly on the adjacent side frame, so that the load is divided in passing from the bolster to the side frame, that is, the helical and leaf springs occupy a parallel load transfer relation with respect to each other.

A bolster side bearing 116 is mounted on the upper web 106 and the vertical axis thereof is preferably aligned with the vertical axis of the spring 110 for reasons hereinbefore explained. As before, the bearing 116 is intended to coact in the usual manner with a body side bearing 117 attached to a body bolster 118.

In arranging the spring suspension in this form of the truck, the coil springs are preferably adapted to carry the major portion of the bolster load, with the semi-elliptic springs sustaining the remaining portion and acting primarily as a dampener for the coil springs. This relative disposition of the springs is very effective, not only for the purpose of providing an adequate spring cushion for the truck, but also prevents the building up of any violent oscillations in the helical springs that are a frequent source of damage to the equipment and also to the lading, as well as frequently causing derailment. Also, it is possible, in this form of the truck, to eliminate the spring planks with a consequent reduction in the weight of the truck, since the usual function of the planks is adequately performed by the bolster in conjunction with the springs 110. In addition, this type of spring suspension tends to stabilize the bolster against brake-application loads.

I claim:

1. In a car truck, the combination of side frames, a bolster having vertical sliding engagement with said frames, a series arrangement of leaf and coil spring groups for supporting said bolster on each of said frames, one group of said springs being located in the window opening of the associated side frame, and a beam substantially hingedly connected at one end to said bolster and at its opposite end resting upon the window opening spring group, said beam being interposed between said spring groups for transmitting the applied load from one to the other.

2. In a car truck, the combination of side frames, a bolster having vertical sliding engagement with said frames, a series arrangement of leaf and coil spring groups for supporting said bolster on each of said frames, the coil spring group being located in the window opening of the associated side frame, and a beam substantially hingedly connected at one end to said bolster and at its opposite end resting upon the coil spring group, said beam being interposed between said spring groups for transmitting the load from one to the other.

3. In a car truck, the combination of side frames, a bolster having vertical sliding engagement with said frames, side bearings on said bolster located inwardly of said frames, a series arrangement of leaf and coil spring groups for supporting said bolster on each of said frames, one group of said springs being located in the window opening of the associated side frame and the vertical axis of the other group being in substantial alignment vertically with one of said side bearings, and a beam substantially hingedly connected at one end to said bolster and at its opposite end resting upon the window opening spring group, said beam being interposed between said spring groups for transmitting the load from one to the other.

4. In a car truck, the combination of side frames, a bolster having vertical sliding engagement with said frames, a series arrangement of leaf and coil spring groups for supporting said bolster on each of said frames, one group of said springs being located in the window opening of the associated side frame, and a beam flexibly connected at one end to said bolster and at its opposite end resting upon the window opening spring group, said beam being interposed between said spring groups for transmitting the load from one to the other.

5. In a truck, the combination of a side frame having tension and compression members and column guides therebetween forming an opening therein, a hollow bolster extending into said opening for cooperation with said guides and having the opposite extremities of its lower web terminating in plates connected thereto for relative movement, coil springs disposed between said plates and said tension members and leaf springs disposed between and bearing solely on said plates and the upper web of said bolster.

6. In a truck, the combination of a side frame having tension and compression members and column guides therebetween forming an opening therein, a hollow bolster extending into said opening for cooperation with said guides and having the opposite extremities of its lower web terminating in plates connected thereto for relative movement, and springs having different characteristics disposed between and bearing solely on said plates and tension members and the upper web of said bolster, respectively.

7. In a truck, the combination of a side frame having tension and compression members and column guides therebetween forming an opening therein, a hollow bolster extending into said opening for cooperation with said guides and having the opposite extremities of its lower web terminating in plates connected thereto for relative movement, a spring group disposed between and bearing solely on said plates and said tension members, and a second spring group disposed between said plates and the upper web of said bolster, one of said groups having absorption characteristics.

MARK H. MARTIN.